Oct. 22, 1963  C. G. LEMON  3,107,811
CARTONS

Filed May 15, 1962  16 Sheets-Sheet 1

Cecil G. Lemon
Inventor
By Cushman, Darby & Cushman
Attorneys

Oct. 22, 1963 C. G. LEMON 3,107,811
CARTONS
Filed May 15, 1962 16 Sheets-Sheet 2
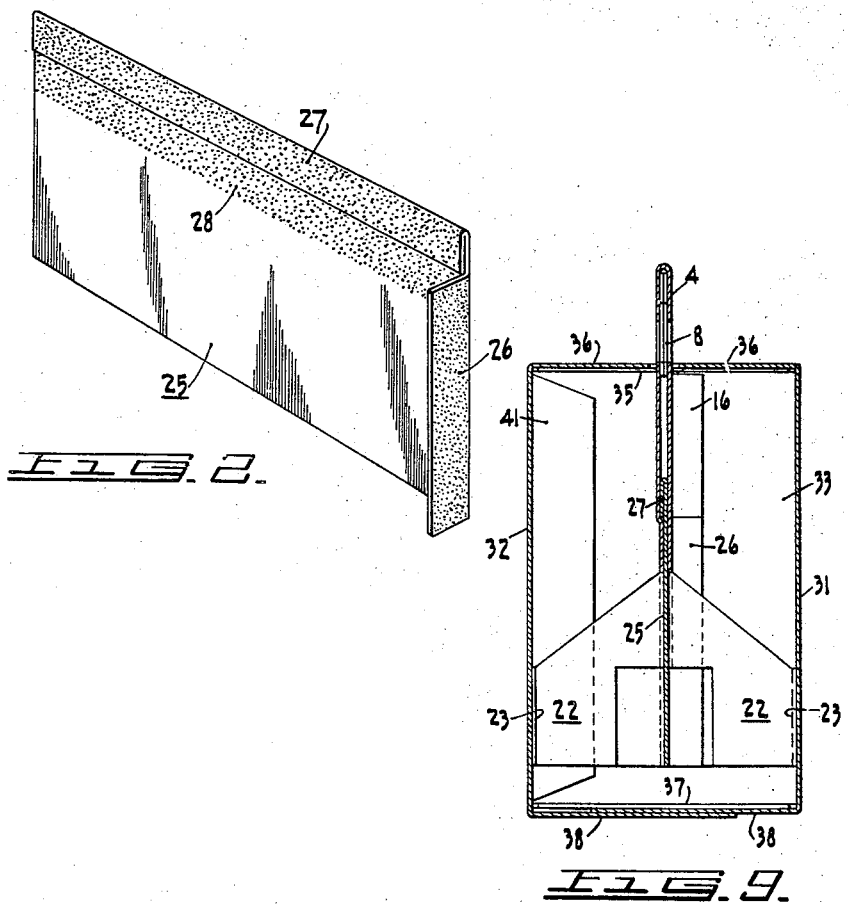
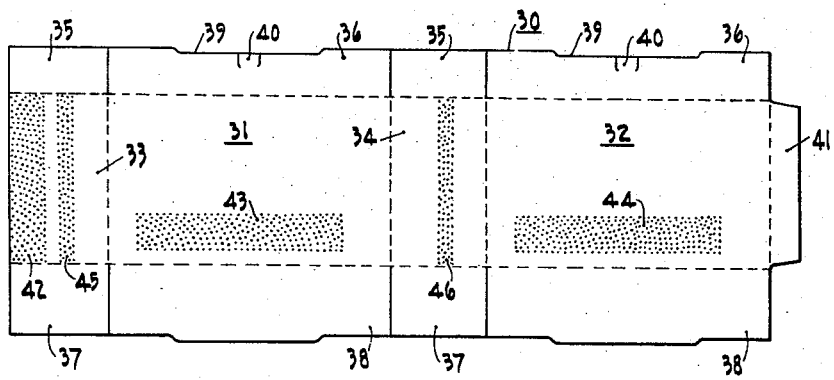

Oct. 22, 1963   C. G. LEMON   3,107,811
CARTONS
Filed May 15, 1962   16 Sheets-Sheet 4
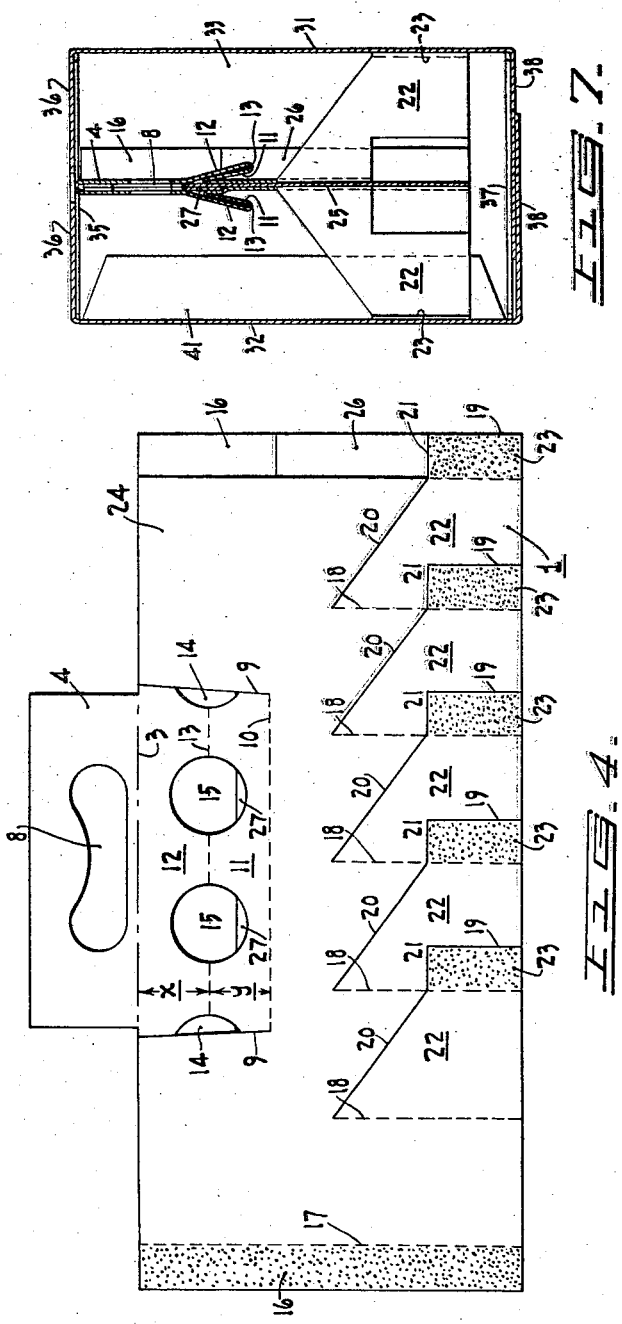

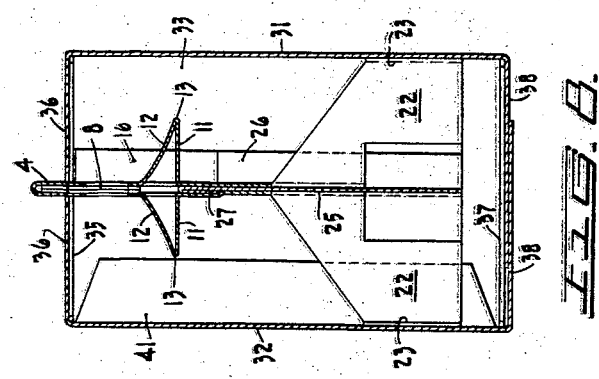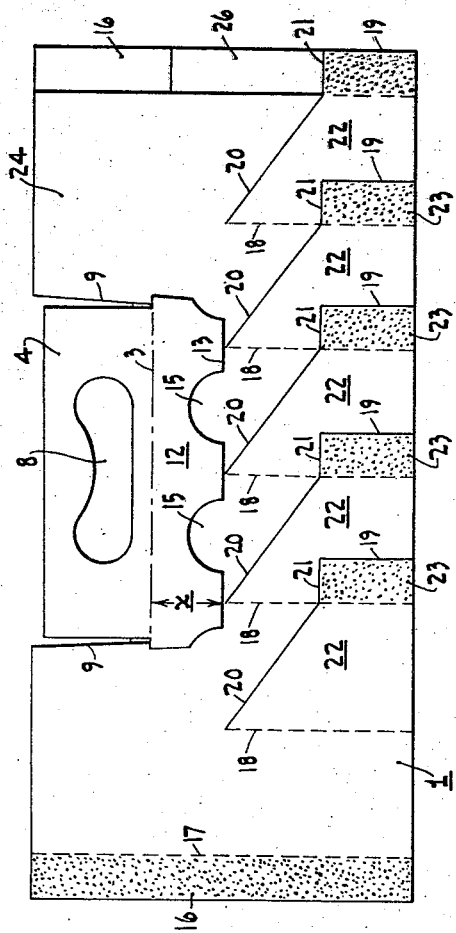

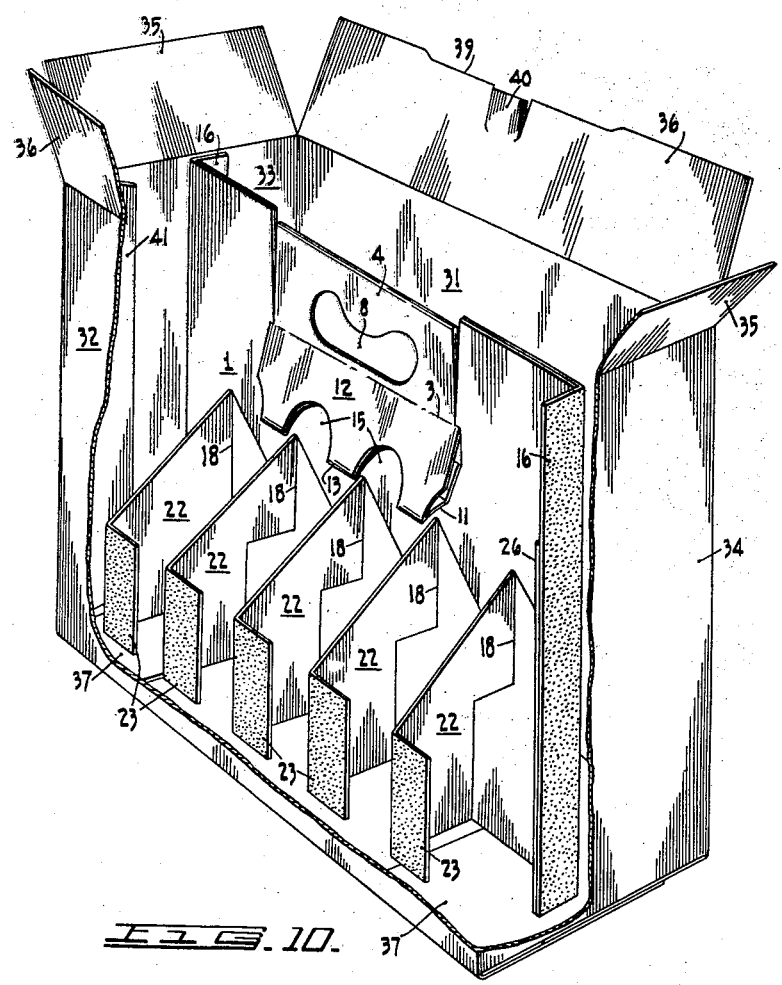

Oct. 22, 1963

C. G. LEMON 3,107,811

CARTONS

Filed May 15, 1962

Cecil G. Lemon
Inventor
By Cushman, Darby & Cushman
Attorneys

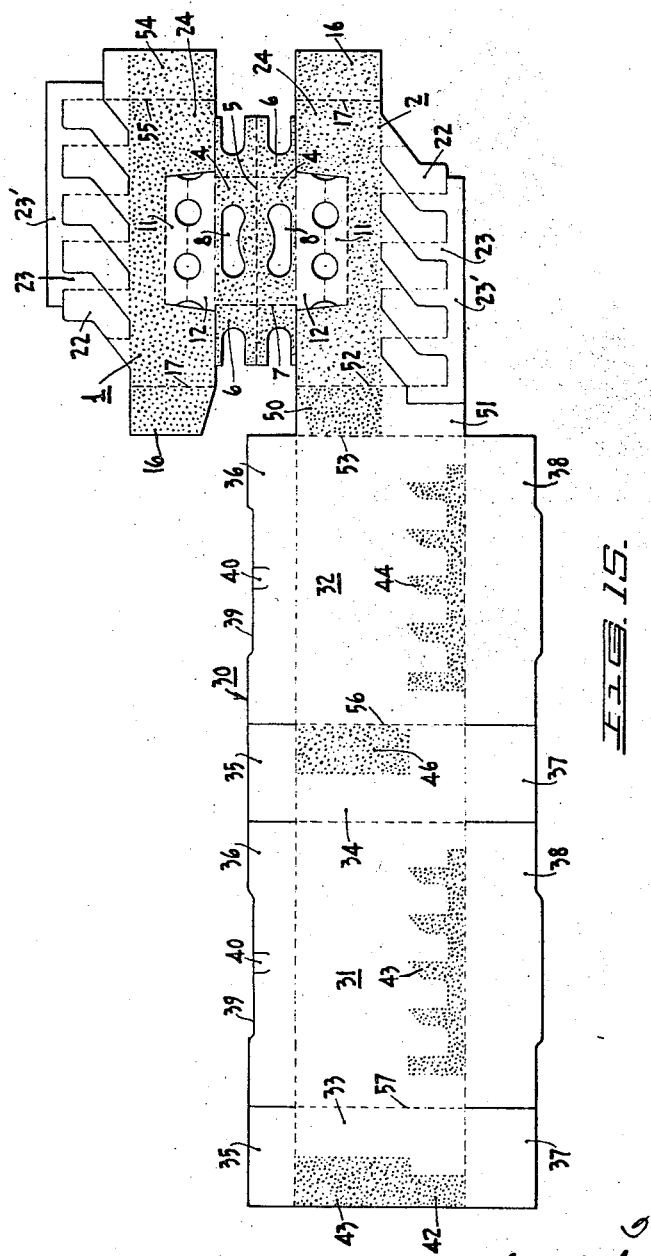

Oct. 22, 1963  C. G. LEMON  3,107,811
CARTONS
Filed May 15, 1962  16 Sheets-Sheet 12
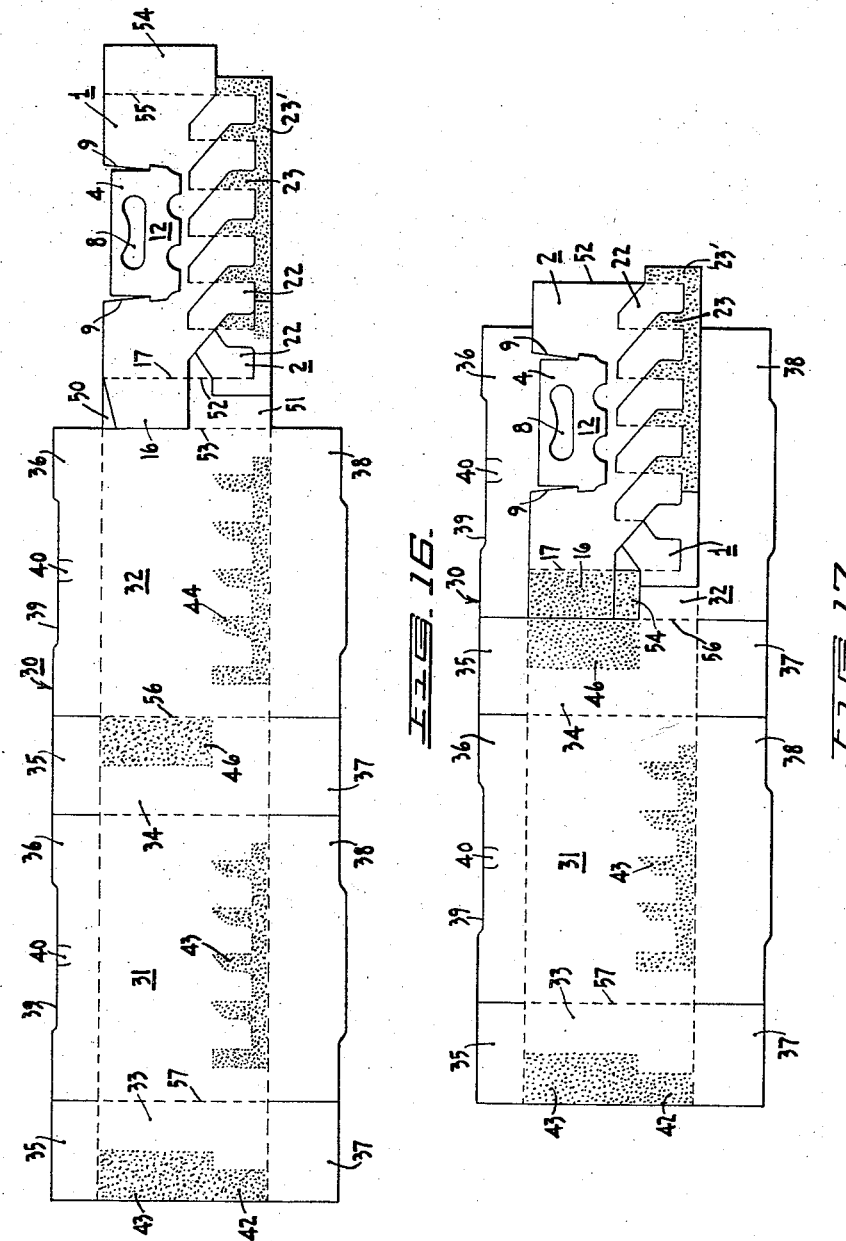
Inventor
Cecil George Lemon
By Cushman, Darby & Cushman
attorneys Oct. 22, 1963　　　C. G. LEMON　　　3,107,811
CARTONS
Filed May 15, 1962　　　　　　　　16 Sheets-Sheet 13
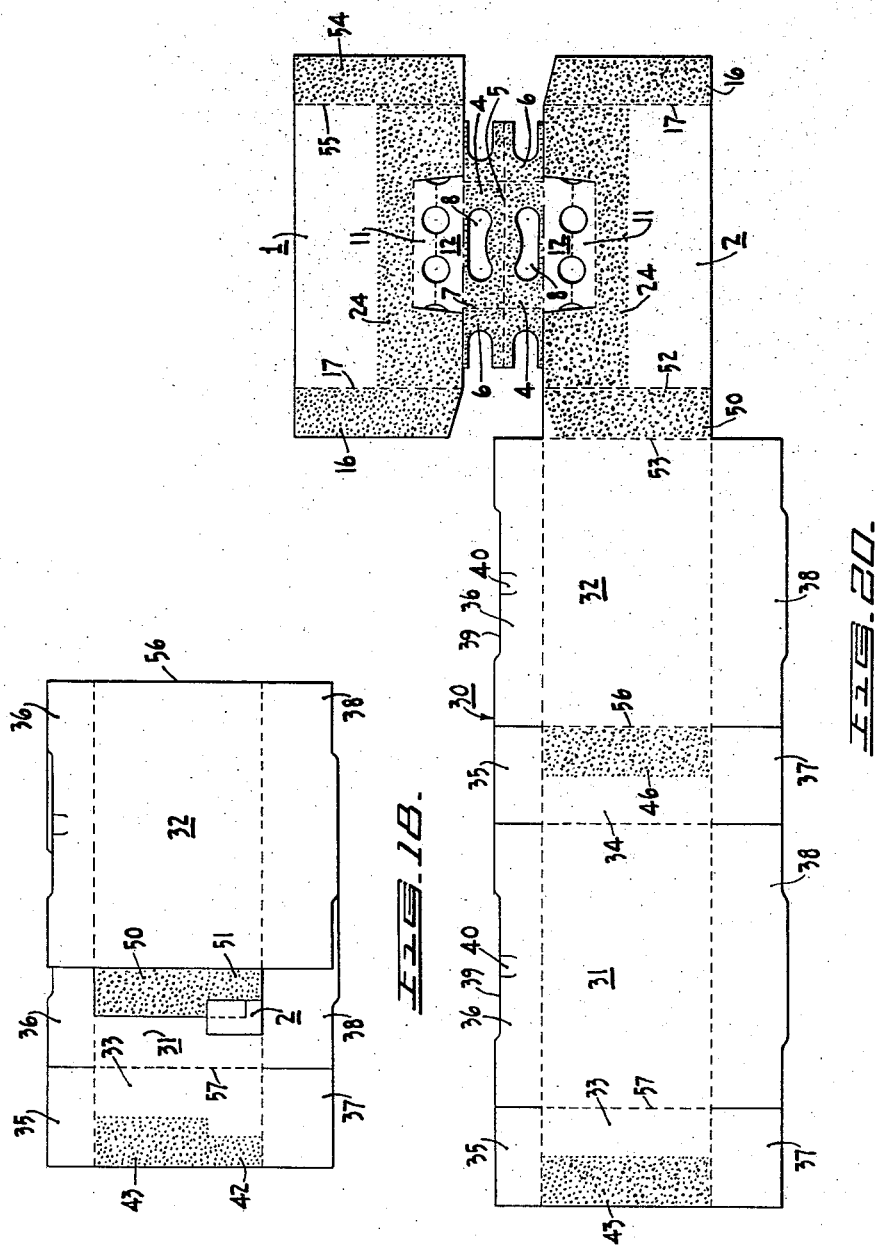

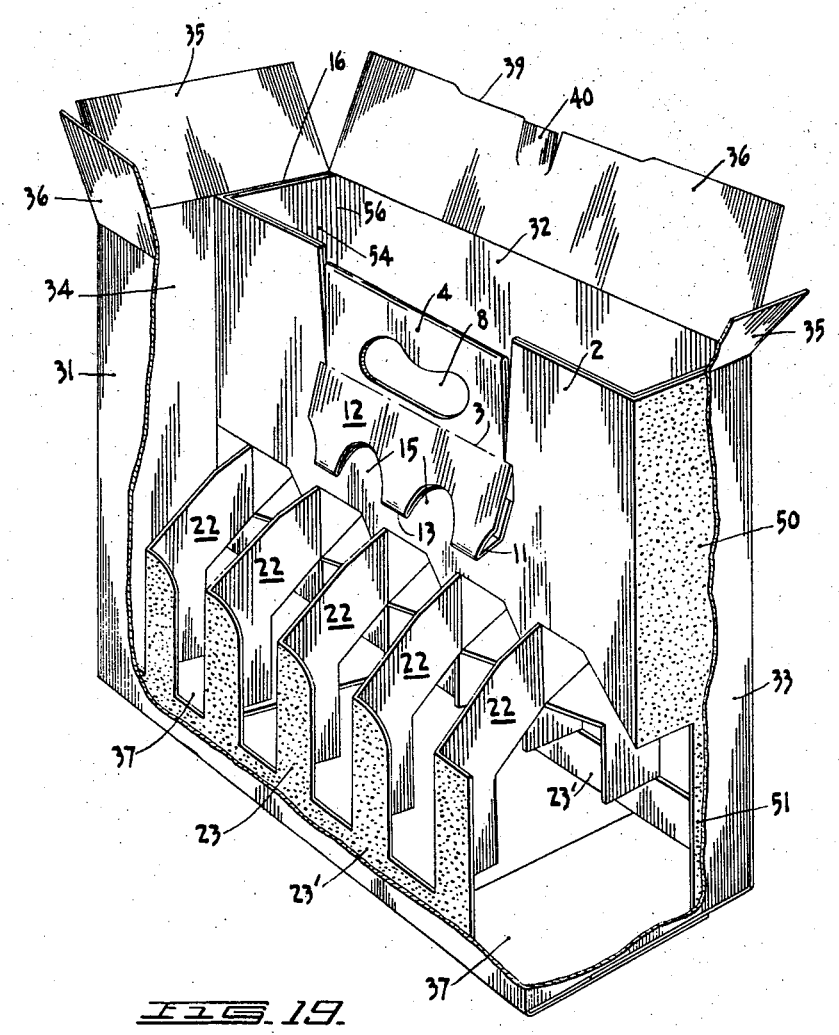

Oct. 22, 1963  C. G. LEMON  3,107,811
CARTONS

Filed May 15, 1962  16 Sheets-Sheet 15

Inventor
Cecil George Lemon
By Cushman, Darby & Cushman
Attorneys

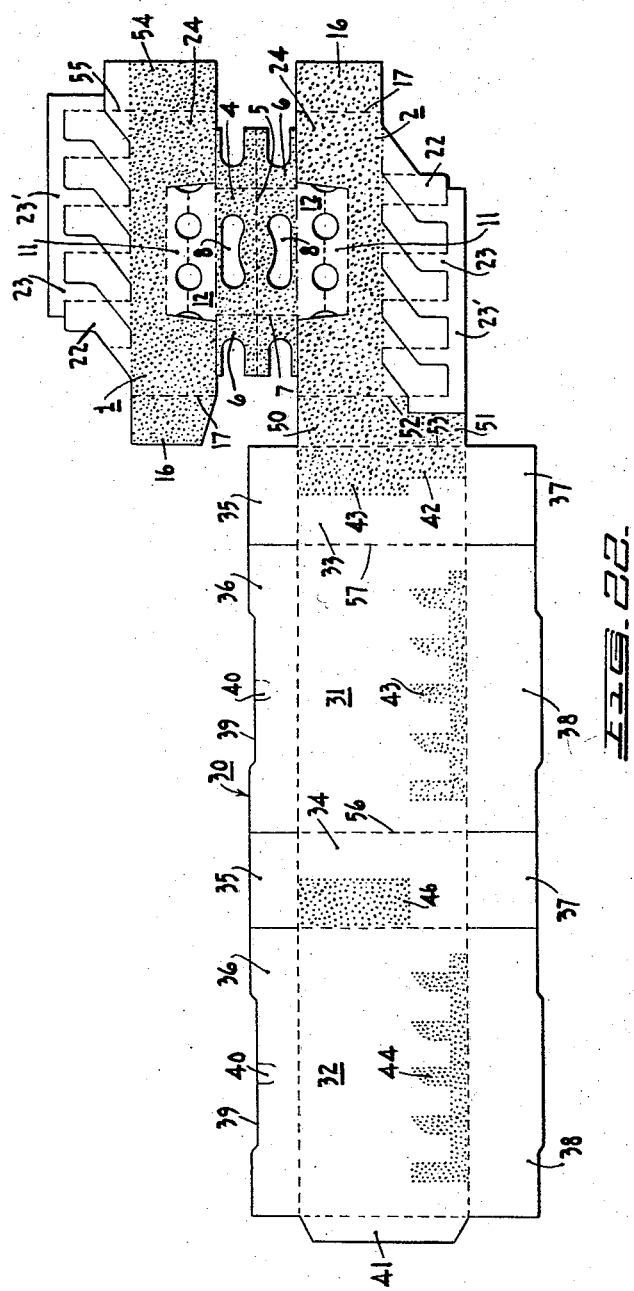

United States Patent Office 3,107,811
Patented Oct. 22, 1963

3,107,811
CARTONS
Cecil George Lemon, North Vancouver, British Columbia, Canada, assignor, by mesne assignments, to Unipak Overseas Ltd., Vancouver, British Columbia, Canada
Filed May 15, 1962, Ser. No. 196,844
Claims priority, application Canada Sept. 16, 1959
6 Claims. (Cl. 229—105)

This invention relates to cartons and more particularly to an improved carrying handle therefor by means of which the carton and its contents can be carried. This application is a continuation-in-part of application Serial No. 44,598, filed July 22, 1960.

Many types of carton carrying handles are known but the present invention is particularly suitable for the type of carton having an interior assembly, defining adjacent longitudinal rows of article receiving compartments therein, secured to the wall structure of the carton. Generally speaking, it has been desirable for the handles to be capable of movement in the vertical plane so that when the cartons have been stacked upon one another, said handles could be located within the cartons and, when it has been desired to carry the cartons, said handles could project from the cartons to a position where they could be grasped.

To achieve this arrangement, it has been necessary for the carton interior assemblies to be secured to the wall structure of the carton and to arrange means incorporated in such assemblies to limit the amount of upward or downward movement of the handles, the arrangement being such that the interior assemblies have, heretofore, been constituted by one or more members, and the handles from another member. This has been costly both from material and manpower.

One object of the present invention therefore, is to overcome this disadvantage, by forming the interior assembly and carrying handle of a carton from one single blank of material so as to form one single member.

Another object of the present invention is to provide a one-piece blank of resilient material adapted to form the interior assembly, carrying handle, and wall structure of a carton.

This invention is illustrated, by way of example, in the accompanying drawings in which:

FIGURE 2 is a part-sectional perspective view of a further blank which, if desired, can also form part of the interior assembly of the carton;

FIGURES 4 and 5 are views of the blanks of FIGURES 1 and 2 showing a still further stage of forming the interior assembly;

FIGURE 6 is a plan view of a blank from which the wall structure of the carton is formed;

FIGURES 7–9 are end sectional elevations showing the interior assembly positioned within the carton with the handle member in various positions;

FIGURE 10 is a part sectional perspective view of the carton showing the handle member in its lowermost position;

FIGURE 15 is a plan view of a one-piece blank adapted to form a wall structure of a carton as well as the interior assembly and handle member thereof;

FIGURES 16 to 18 are views of the one-piece blank of FIGURE 15, showing various stages of forming the blank into a knockdown carton;

FIGURE 19 is a part-sectional perspective view of an erected carton formed by the one-piece blank of FIGURE 15, showing the handle member in its lowermost position;

FIGURE 20 is a plan view of a modified one-piece blank adapted to form the wall structure, interior assembly, and handle member of a carton;

FIGURE 22 is a plan view of a further modified form of one-piece blank also adapted to form the wall structure, interior assembly and handle member of a carton.

Figure 1:
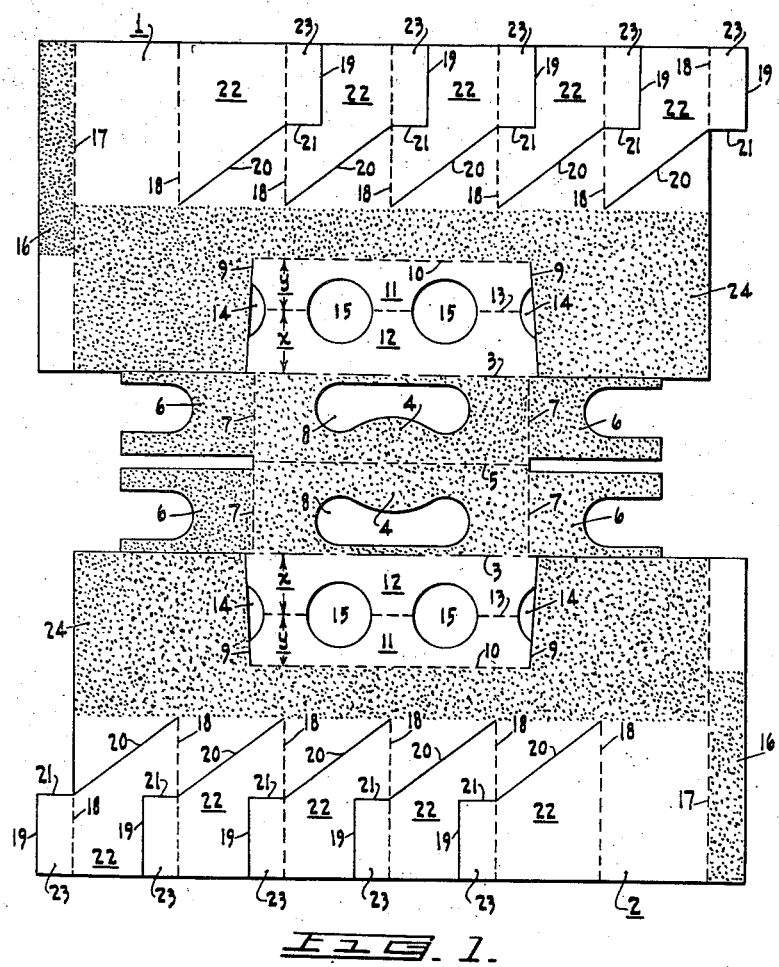
FIGURE 1 is a plan view of a one-piece blank adapted to form the interior assembly of a carton.

Referring to the drawings, and in particular to FIGURES 1 to 12, the one-piece blank shown in FIGURE 1, which is adapted to form a unitary member constituting an interior assembly of adjacent longitduinal rows of article receiving compartments within a carton and fixed to the wall structure of the latter, as well as constituting a carton carrying handle, is cut and scored to provide a pair of primary panel portions 1, 2. Each of the primary panels is provided along an unscored line 3, with an auxiliary panel 4, said pair of auxiliary panels being integrally connected together along a first common score line 5. Each auxiliary panel 4 is provided with integral end tabs 6 connected thereto along score lines 7. The face shown in FIGURE 1 of the auxiliary panels 4 and their end tabs 6 is coated with any suitable pressure sensitive adhesive and the obverse face of the end tabs 6 is also similarly coated (see FIGURE 3). Each auxiliary panel 4 is also provided with a hand aperture 8.

Each primary panel portion 1, 2 is provided with a pair of angular incisions 9 which converge slightly towards one another at their ends remote from the end tabs 6 and which are connected together at their said converging ends by a second common score line 10 parallel with the unscored line 3 and first score line 5. It will be observed that the ends of the incisions 9 adjacent to the end tabs 6 are slightly spaced from the score lines 7 and the purpose of this will be apparent hereinafter. The portion of each primary panel 1, 2 bounded by the score line 10, incisions 9 and unscored line 3, is divided into two ancillary panel portions 11, 12 by a third common score line 13 parallel with the score lines 3, 10. A semicircular cut-out 14 is provided at either end of the ancillary panels 11, 12 extending across the third common score line 13, and a pair of circular cut-outs 15 are also provided located between the end cut-outs 14 and extending across the third common score line 13. As will be observed from reference to FIGURE 1, the depth $x$ of the ancillary panel 12, or selected ancillary panel portion, is slightly greater than the depth $y$ of the ancillary panel 11 and the reason for this will also be apparent hereinafter.

One end of each primary panel 1, 2 is also provided with a hingeable end tab 16 connected thereto along a geminal score line 17 parallel with the score lines 7, and coated with pressure sensitive adhesive along a portion of its length. Furthermore, each primary panel 1, 2 is provided with a plurality of spaced vicinal score lines 18 parallel with the geminal score line 17 and extending from one free marginal edge of the primary panels, each of the latter also being provided with a plurality of intermediate incisions 19 parallel with the vicinal score lines 18 and of a shorter length than the latter. An angular incision 20 connects the end of each score line 18, remote from the free marginal edge of each primary panel, with the adjacent score line 18 at a point approximately midway along the length of the latter. An incision 21 parallel with the free marginal edge of each primary panel then connects the other end of each angular incision 20 with the adjacent incision 19.

Thus, each portion of each primary panel bounded by the free marginal edge thereof, the vicinal score lines 18 and the angular incision 20 constitute a secondary panel portion, indicated generally at 22, whilst each portion of each primary panel bounded by the free marginal edge thereof and the incisions 19, 21 constitutes an end tab 23 integral with each secondary panel 22.

As will be seen from FIGURE 1, an area 24 of pressure sensitive adhesive extends across each primary panel between the geminal score line 17 and the terminal end edge, remote from said score line 17, of said primary panel. Moreover, the area 24 of the adhesive also extends between the second score line 10 and the adjacent end of each vicinal score line 18, and surrounds the panels 11 and 12. The obverse face of each of the end tabs 16 and 23 is also coated with pressure sensitive adhesive as is indicated in FIGURE 4.

It is preferable, although not essential, for the interior assembly to incorporate an occlusion panel such as that shown in FIGURE 2 and indicated generally at 25, in order to prevent articles in one row of compartments from contacting articles in the adjacent row of compartments. Each end of the panel 25 is folded so as to form a hingeable end tab 26 (one such tab being shown in FIG. 2), one face of which is coated with pressure sensitive adhesive and one marginal edge is folded over so as to form a marginal fold 27. A strip 28 of pressure sensitive adhesive also extends across the panel 25 on both faces thereof and adjacent to the marginal fold 27.

Figure 3:
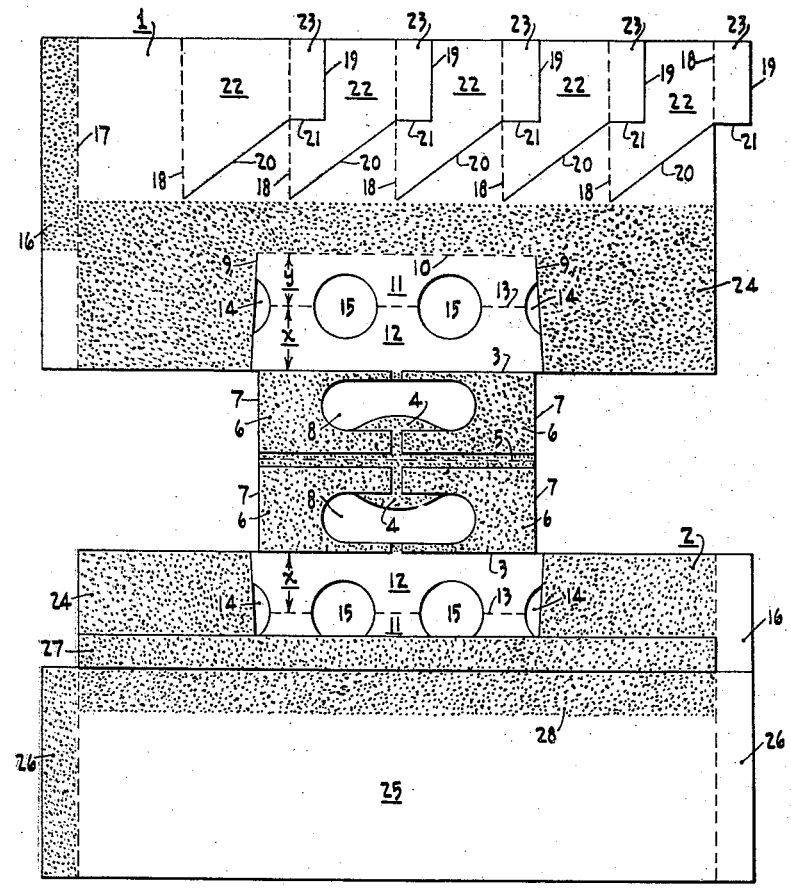
FIGURE 3 is a plan view of the blank shown in FIGURE 1 but having the blank shown in FIGURE 2 superimposed thereon during one stage of forming the interior assembly therefrom.
Figure 11:
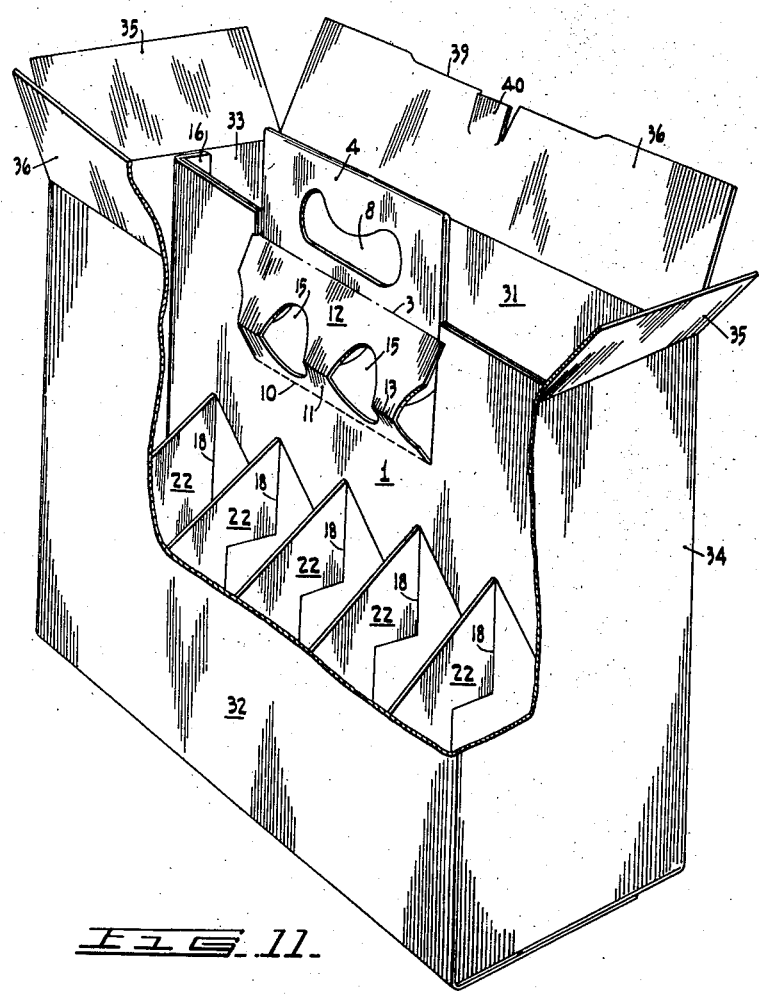
FIGURE 11 is a view similar to FIGURE 10 but showing the handle member partially extended.
Figure 12:
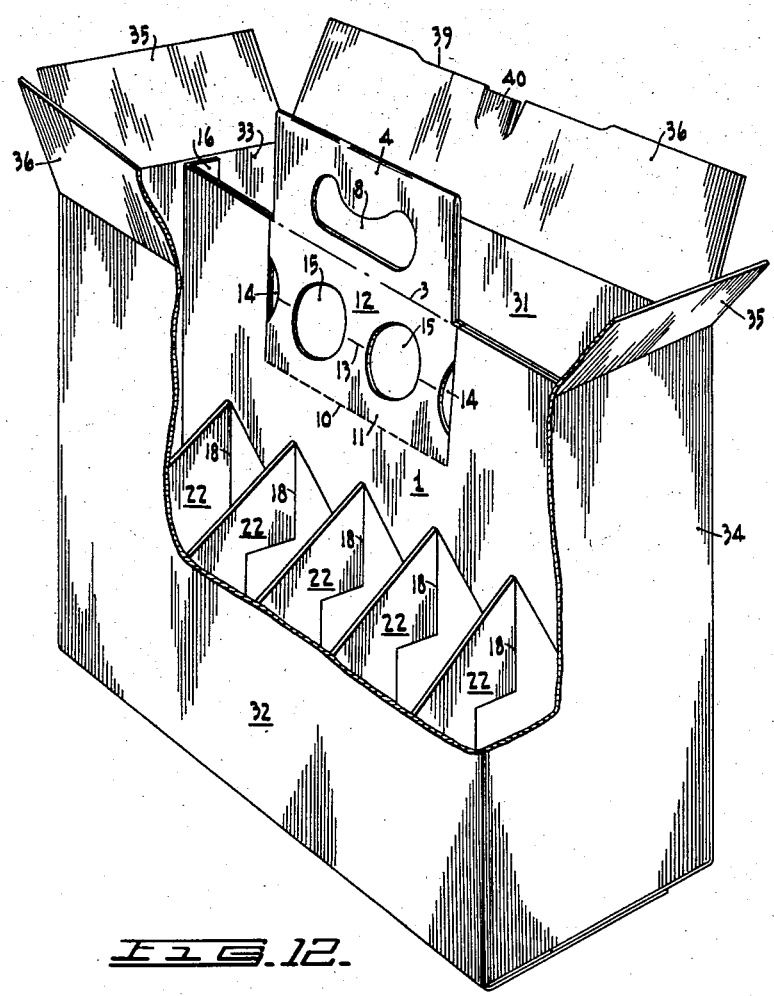
FIGURE 12 is a further part sectional perspective view of the carton showing the handle member in its fully extended position.

In forming the interior assembly from the blanks shown in FIGURES 1 and 2, the occlusion panel 25 is placed upon the primary panel 2 as shown in FIGURE 3 so that the strip of adhesive 24 on the latter will adhere with the strip 28 of adhesive on the adjacent face of the occlusion panel 25 and so that the coated surface of the right-hand end tab 26 of the latter will adhere to the coated surface of the end tab 16 of the primary panel 2. At this stage of the assembly, the end tabs 6 of the auxiliary panels 4 are folded inwardly along the score lines 7 and caused to adhere to said auxiliary panels 4.

Thereafter, and as shown in FIGURE 4, the primary panel 1 is folded along the first common score line 5 and is pressed down into contact with the combined primary panel 2 and occlusion panel 25. This enables the end tabs 6 of each auxiliary panel 4 to adhere with one another and the coated strip 24 of the primary panel 1 to adhere to the coated strip 28 of the occlusion panel 25 as well as bringing about adhesion between the end tab 16 of the primary panel 1 and the left-hand end tab 26 of the occlusion panel 25.

As will be seen from FIGURE 4, the handle, formed by the combined panels 4 and end tabs 6, projects above the common upper edge of the combined primary panels 1, 2 when the formation of the blank has reached this stage. Consequently, before the interior assembly is mated with the blank forming the wall structure of the carton and shown in FIGURE 6, it is necessary to depress the handle portion so that its upper edge is coincident, or substantially so, with the common upper edge of the primary panels 1, 2 and so that the handle will be in its depressed position when the carton is filled.

The handle is moved and retained in its depressed position due to a number of factors, i.e. the adhesion which exists between the handle panels 4 and end tabs 6, the adhesion at 24 of the primary panels 1, 2 surrounding the incisions 9 and second score line 10; the lack of a score line extending between each selected ancillary panel 12 and the adjacent handle panel 4; the provision of the parallel second and third score lines 10, 13; and the fact that the depth $x$ of the complementary mutually opposed selected ancillary panels 12 is greater than the depth $y$ of the remaining complementary mutually opposed ancillary panels 11.

Accordingly, when the andle portion 3 is moved downwardly, as viewed in FIGURE 4, the pair of opposed selected ancillary panels 12, which have a natural tendency to lie parallel to one another, will oppose such downward movement and will urge the opposed third common score lines 13 outwardly substantially at right angles to the plane of the handle portion. Continued downward movement of the handle portion will also cause the opposed panels 11 to hinge about their second and third score lines 10, 13 until the latter are in the same horizontal plane (see FIGURE 8) when the third common score lines 13 will have reached their dead-centre position. Continued downward movement of the handle portion will force the third common score lines 13 over dead-centre whereupon the natural resiliency of the selected ancillary panels 12 will assert itself so that the latter panels will then assist such downward movement until each of the remaining pair of opposed ancillary panels 11 will be located between an associated selected ancillary panel 12 and the adjacent longitudinal partition and so that the upper edge of each of the panels 12 will be coincident, or substantially so, with the commmon upper edge of the primary panels 1, 2 as shown in FIGURE 7.

The blank forming the wall structure of the carton, i.e. side and end walls and bottom thereof, and top closure of the carton, is indicated generally at 30 in FIGURE 6 and is scored and incised to provide side walls 31, 32, end walls 33, 34, top end closures 35, top side closures 36, bottom end closures 37 and bottom side closures 38.

Each of the top side closures 36 may be recessed as at 39, and a hingeable tab 40 may also be provided therein to form a finger aperture. The free end of side wall 32 is provided with an elongated tab 41 which is adapted to be united with the free side of the end wall 33 through the intermediary of a strip 42 of pressure sensitive adhesive extending throughout the depth of said end wall 33 adjacent to its free marginal edge.

Each of the side walls 31, 32 is provided with a strip 43, 44 respectively of pressure sensitive adhesive, whereas the end walls 33, 34 are respectively provided with similar strips 45, 46 of adhesive.

In assembling the form of carton shown in FIGURES 7–12 to its knock-down form, the unitary member shown in FIGURE 5 is placed on the carton blank shown in FIGURE 6 so that the end tabs 23 of the secondary portions 22 of the primary panel 2 will be in registry with the adhesive strip 43 on the side wall panel 31, and so that the coated surface of the end tab 16 of the primary panel 2 is in registry with the coated strip 46 on end wall panel 34. Thereafter, the side wall panel 32 is folded over so that its coated strip 44 will be brought into registry with the coated faces of the end tabs 23 of the primary panel. The remaining end wall panel 33 is then folded over so that its coated strip 45 is brought into registry with the coated surface of the end tab 16 of the primary panel 1 and so that its other coated strip 42 is brought into registry with the coated surface of the elongated tab 41 of the side panel 32. Pressure is then applied to the assembly to bring about adhesion between the components. The form of carton shown in FIGURES 7–12 will thus be in its knock-down condition.

When the form of carton shown in FIGURES 7–12 is opened from its knock-down condition, due to the adhesion between the components of the carton interior assembly and the wall structure of the carton, the end tabs 16 of the primary panels 1, 2 will bend about their associated geminal score lines 17 as will the end tabs 26 of the occlusion panel 25 so that said primary panels will be mutually opposed and adjacent to one another and will extend along the longitudinal axis of the carton. Thus, the end tabs 16 of the primary panels 1 and 2 form means for attaching the ends of the primary panels to the wall structure of the carton, and the end tabs 26 of the occlusion panel 25 form means for attaching the ends of the last-mentioned panel to the wall structure of the carton.

Concurrently, and due to the adhesion existing between each secondary panel portion 22 and the side walls 31, 32, through the intermediary of the end tabs 23, said secondary panel portions 22 will be pulled outwardly away from the main portion of their associated primary panel portions 1, 2. As this occurs, due to the hingeable connections 18 existing between the end tabs 23 and the secondary panel portions 22 and also between the opposite ends of the secondary panel portions 22 and their associated primary panel portions, said secondary panel portions will extend at right angles to said primary panel portions and to the side walls 31, 32 to form transverse partitions within the carton. The end tabs 23 thus form means for attaching the transverse partitions to the wall structure of the carton.

The secondary panel portions 22, define a cut-out area in their associated primary panel portions 1, 2 upon the hinging movement thereof just described and upon the erection of the form of carton shown in FIGURES 7–12 from its knock-down condition. However, such a cut-out area is occluded by the provision of the occlusion panel 25 which, together with portions of the primary panel portions 1, 2 (other than the end tabs 16, 23, secondary panel portions 22, ancillary panel portions 11, 12, and handle carrying portions 4), constitute a longitudinal partition within the carton and said longitudinal partition and the transverse partitions define a plurality of article receiving compartments within the carton.

For filling purposes, the bottom end and side flaps 37, 38 are folded over and adhesively secured together, stapled or otherwise fastened in known manner. After the carton has been filled with the desired number of articles, the top end and side flaps 35, 36 are folded over and secured in a similar manner. It should be noted that, as the ancillary panel portions 11, 12 are angularly disposed to the primary panel portions 1, 2, removal of the material from the said ancillary panel portions to form the semi-circular cut-outs 14 and the circular cut-outs 15 assists in the easy filling of the respective article compartments, and also permits the selected ancillary panel portions 12 to swing the third common score lines 13 over dead-centre without fouling the content of the carton.

When it is desired to carry a filled carton, the user merely inserts his fingers between the hingeable tabs 40 in the top side flaps 36 and grasps the handle portion 4 pulling upwardly thereon. The natural resiliency of the ancillary panel portions 12 will oppose such upward movement and will again urge the score lines 13 outwardly substantially at right angles to the plane of the handle carrying portion 4.

Continued upward movement of the handle portion will also cause the remaining ancillary panel portions 11 to hinge about their second and third score lines 10, 13 until the latter are in the same horizontal plane as is shown in FIGURE 8 which is the dead-centre position of the second common score lines 13. Further upward movement of the handle carrying portion 4 will force the third common score lines 13 over dead-centre whereupon the natural resiliency of the selected ancillary panel portions 12 will assist the upward movement of the handle portion until the ancillary panels 11, 12 assume the position shown in FIGURE 9.

Figure 13:
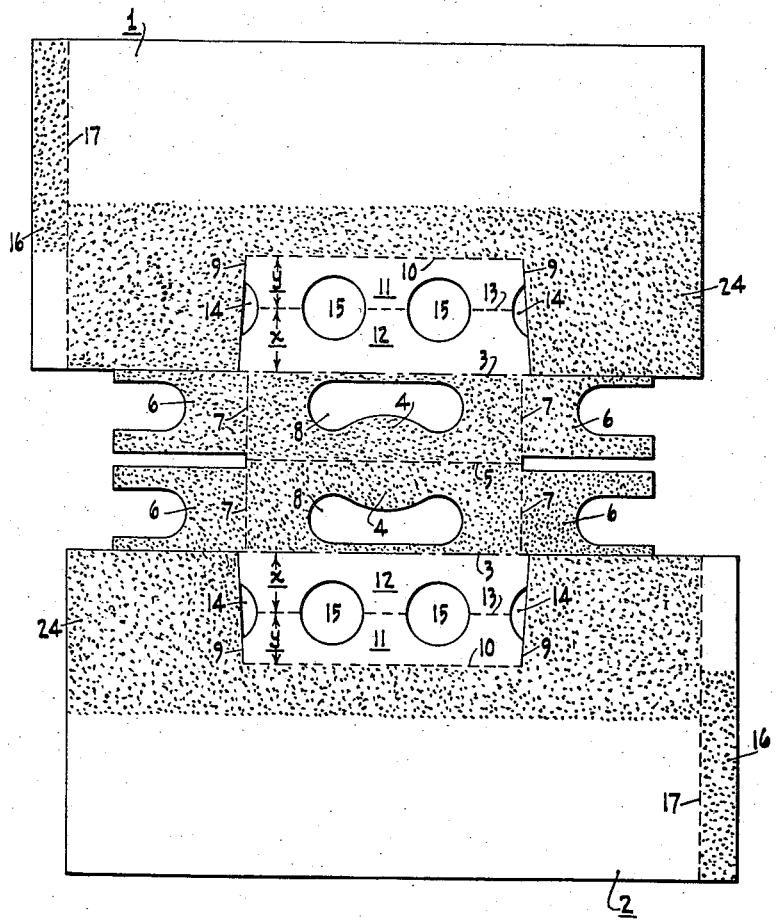
FIGURE 13 is a plan view of a modified form of one-piece blank adapted to form the interior assembly of a carton.
Figure 14:
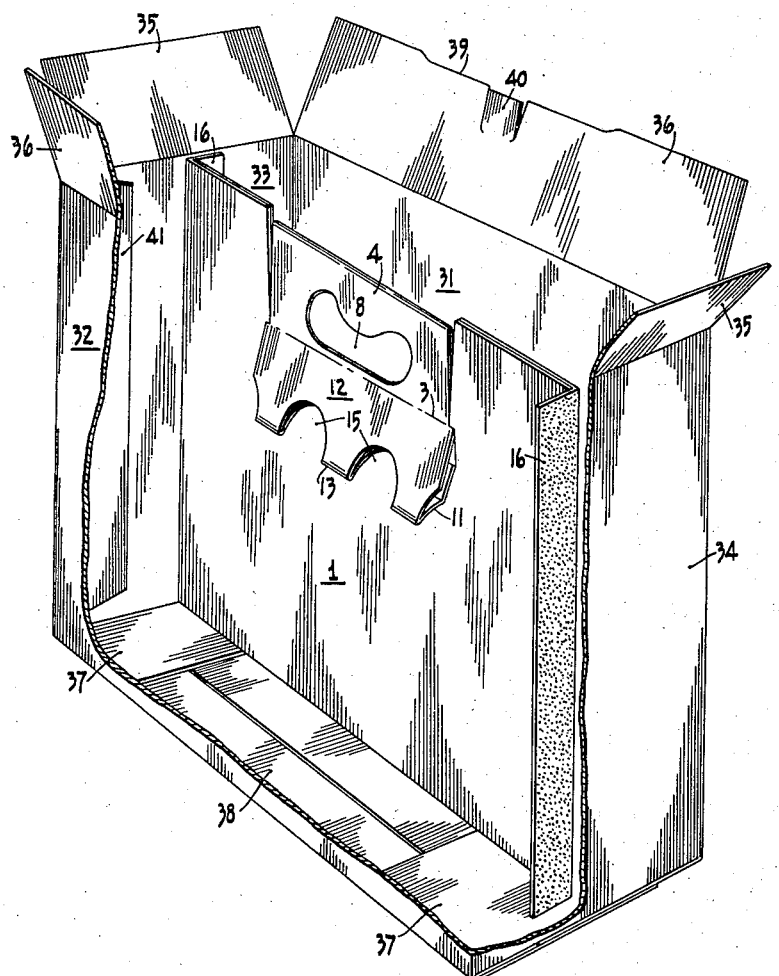
FIGURE 14 is a part-sectional perspective view of the carton formed from the blank shown in FIGURE 13 with the handle member in its lowermost position.

It is within the scope of the present invention to provide a carton with an interior assembly formed of a unitary member serving merely as a central longitudinal partition secured to the wall structure. Reference should now be made to FIGURES 13 and 14 of the accompanying drawings.

As will be seen from FIGURE 13, the one-piece blank for forming such an interior assembly, is merely cut and scored to provide a pair of primary panel portions 1, 2, a pair of auxiliary handle carrying panel portions 4 complementary pairs of end tabs 6, complementary pairs of ancillary panel portions 11, 12 and a pair of hingeable end tabs 16. Obviously, as the secondary panel portions are not provided, an occlusion panel 25, such as that described above in connection with the form of carton shown in FIGURES 7–12 is not required.

The blank shown in FIGURE 13 is otherwise folded in a similar manner to that described above in connection with the first form of carton and is mated with a wall structure blank similar to that shown in FIGURE 6 but omitting the glued areas 43, 44 on the side wall panels. The resultant carton is shown in FIGURE 14 and the extensible handle will operate in exactly the same manner in both forms of the invention.

It will be recalled that the ends of the incisions 9 adjacent to the end tabs 6 are slightly spaced from the score lines 7, see FIGURES 1, 3 and 13. Accordingly, the ends, adjacent to the unscored line 3, of the selected ancillary panel portion 12 of both embodiments, form a pair of mutually opposed cheeks which, on movement of the handle in either direction, are adapted to embrace the converging angular incisions 9 of the primary panel portions 1, 2 as can more easily be even in FIGURES 5, 10, 11 and 14. Thus, these cheeks serve, on movement of said handle in either direction, to guide said handle and maintain its movement in a substantially vertical plane.

From the above description, it will be appreciated that the carrying handle is capable of movement between a first retracted position in which said handle lies beneath said top closure and a second operative position in which said handle projects above said top closure, and vice versa. In both forms of the invention, the pair of selected ancillary panel portions 12 initially resist movement of the handle in either direction, for a predetermined amount of movement thereof, and, due to their depth being greater than the remaining pair of ancillary panel portions 11 coupled with the choice of material, will be deformed until the third common score line 13 rides over dead-centre. Thereafter, the natural resiliency of the material of the pair of selected ancillary panel portions 12 will assert itself and said panels will directly and solely assist movement of the handle to either of the two positions and, thereafter, will maintain said handle in either of its said positions.

It is, of course, within the scope of the present invention, to omit the top closure of the carton.

Moreover, as will be seen more clearly from FIGURES 1, and 3 to 5, a first vicinal score line 18, adjacent to geminal score line 17, forms the hingeable connection between one of the end secondary panel portions 22 and its associated primary panel portion, whereas a second vicinal score line 18 associated with the end tab 19 of the other end secondary panel portion 22 forms the hingeable connection between said end tab and said other end secondary panel portion. The remaining vicinal score lines 18, intermediate said first and second vicinal score lines 18, each simultaneously form the hingeable connection between the secondary panel portions 22, intermediate said end secondary panel portions, and their associated primary panel portions as well as the hingeable connections of their associated end tabs 23. Moreover, as will be seen from the drawings, the hingeable connections of the intermediate secondary panel portions 22 and their end tabs 23 are in alignment with one another.

Referring now to FIGURE 15, the interior assembly, handle member, and wall structure of the carton can be formed from one and the same one-piece blank. Insofar as is possible, identical portions in FIGURES 15 to 22, have been given the same reference numerals as have been employed in FIGURES 1 to 14. However, for the sake of clarity, some reference numerals have been omitted from FIGURES 15 to 22 but it is to be understood that the unreferenced portions of these figures will have, for their antecedents, their origin in FIGURES 1 to 14.

As will be seen from FIGURE 15, that portion of the one-piece blank adapted to form the wall structure of the carton is indicated generally at 30. The difference between portion 30 of FIGURE 15 and the blank 30 shown in FIGURE 6 is that the strips 43, 44 of pressure sensitive adhesive on the side wall panels 31, 32 are of a slightly different shape, as is the strip 46 on the end wall panel 34. Moreover, the strip 43 of adhesive on end wall panel 33 in FIGURE 15 is of a larger area and also has a reduced portion 42.

The primary panels 1 and 2 shown in FIGURE 15 are, as is described above, integrally connected together along a first common score line 5. Each of said primary panels 1, 2 is also provided with an auxiliary panel 4 having integral end tabs 6. Moreover, as will be seen from FIGURE 15, each of the primary panels 1, 2 is provided with two ancillary panel portions 11, 12.

Each of the primary panels 1, 2 of the one-piece blank shown in FIGURE 15 is slightly different from the blank shown in FIGURE 1 inasmuch as the lower ends of the end tabs 23 of each secondary panel portion 22 of the one-piece blank of FIGURE 15 are integrally connected to one another by a panel 23'.

The end of primary panel 2, remote from the end tab 16, is integrally connected to the wall structure 30 by means of tertiary panel 50 having a reduced portion 51, said panel 50 and its reduced portion 51 corresponding in area to the strip 43 of adhesive and its reduced portion 42 on the end wall panel 33 of the wall structure 30. The tertiary panel 50 is integrally connected, at one side thereof, to the primary panel 2 by means of a first geminal common score line 52 and, at its other end, to the side wall panel 32 of the wall structure 30 by means of an auxiliary common score line 53.

It will be noted from FIGURE 15 that the upper face of the end tab 16 of the primary panel 1 is coated with pressure sensitive adhesive as is a corresponding area of the upper face of the tertiary panel 50. The obverse face (not shown in FIGURE 15) of the tertiary panel 50 and its reduced portion 51 is also coated with pressure sensitive adhesive.

The primary panel 1, remote from its end tab 16, is provided with a second hingeable end tab 54 integrally connected thereto along a common score line 55.

As will be noted from FIGURE 15, the upper face of end tab 16 of the primary panel 2 is coated with pressure sensitive adhesive as is a corresponding area of the upper face of the end tab 54 of primary panel 1. A portion of the obverse face (not shown in FIGURE 15) of the end tab 54 of the primary panel 1, as well as the obverse face of end tab 16 of primary panel 2, is also coated with pressure sensitive adhesive.

An area 24 of the upper face of each of the primary panels shown in FIGURE 15, is also coated with pressure sensitive adhesive, as is the upper face of each of the auxiliary panels 4 and their end tabs 6.

The obverse face (not shown in FIGURE 15) of each of the end tabs 6, the end tabs 23 and their associated panels 23', is also coated with pressure sensitive adhesive.

In forming a knock-down carton from the one-piece blank shown in FIGURE 15, each pair of end tabs 6 is folded over and secured to its associated auxiliary panel 4 as is described above and shown in FIGURE 3. The primary panel 1 is then folded along the common score line 5 and its coated area 24 secured to the coated area of the primary panel 2. Concurrently, the coated face of end tab 16 of primary panel 1, will be secured to the coated upper face of the tertiary panel 50, and the coated upper face of end tab 54 of primary panel 1 will adhere to the coated upper face of end tab 16 of primary panel 2.

Thereafter, the handle portion is depressed so that its upper edge is coincident, or substantially so, with the common upper edge of the primary panel 1, 2 so that said handle will be in its depressed position when the carton is filled.

The handle is moved and retained in its depressed position due to the same factors described above in connection with FIGURES 1 to 14.

Accordingly, the components of the one-piece blank will have assumed the position shown in FIGURE 16.

Thereafter, the portion of the one-piece blank adapted to form the interior assembly is folded along the common score line 52 connecting the primary panel 2 with its tertiary panel 50, whereby the coated face of each of the end tabs 23 and panel 23' of the primary panel 1 will be brought into alignment with the coated strip 44 of the side wall panel 32, and whereby the coated obverse face of the end tab 16 of primary panel 2 and the coated obverse face of end tab 54 of primary panel 1 faces upwardly. This position is shown in FIGURE 17.

The one-piece blank is then folded along score line 56 integrally connecting the side wall panel 32 with the adjacent end wall panel 34 so that the coated face (as shown in FIGURE 17) of the end tab 16 of primary panel 2 and the coated face of the end tab 54 of primary panel 1 is brought into alignment with the coated strip 46 on the end wall panel 34. Concurrently, the coated face of the end tabs 23 and panel 23' of the primary panel 2 will be brought into alignment with the coated strip 43 on the side wall panel 31. Such folding will bring the obverse (as viewed in FIGURE 15) coated face of the tertiary panel 50, and its reduced portion 51, of the primary panel 2 uppermost, as is shown in FIGURE 18.

To complete the carton to its knock-down form, it is then merely necessary, to fold the blank about score line 57 integrally connecting end wall panel 33 to side wall panel 31 so that the coated strip 43, and its reduced portion 42, on the end wall panel 33 is brought into registry with the tertiary panel 50 and its reduced portion 51. Pressure is then brought to bear on the blank to secure proper adhesion between the components.

When the knock-down carton, formed from the one-piece blank shown in FIGURES 15 to 18, is erected and due to the adhesion between the components of the carton interior assembly and the wall structure of the carton, the end tabs 54 and 16 of primary panels 1 and 2 respectively, will bend about their respective score lines 55 and 17. Similarly, the end tab 16 of primary panel 1 will bend about its score line 17 as will the tertiary panel 50 about the first geminal score line 52. Such hinging movement will cause the primary panels 1 and 2 to be mutually opposed and adjacent to one another and to extend along the central longitudinal axis of the carton from one end wall to the other, so as to form a longitudinal partition.

Due to the adhesion existing between each series of end tabs 23 and their associated panel 23' and the adjacent side wall of the carton, the secondary panel portions 22 of each primary panel 1, 2 will hinge outwardly and away therefrom so as to extend at right angles to the side walls and the primary panels so as to form a plurality of transverse partitions. A plurality of adjacent rows of article receiving compartments will thereby be formed within the carton and, due to the transverse partitions, in each series thereof, being integrally connected to one another by means of the end tabs 23 and panel 23' which are secured to the adjacent side walls, the load of the carton will be evenly distributed throughout all integers. The interior of an erected carton, formed by the one-piece blank shown in FIGURES 15 to 18, is shown in FIGURE 19 with the handle portion in its depressed condition.

Due to the choice of design of the secondary panel portions 22 shown in FIGURE 15, when the carton is erected, a portion of the upper edge and the entire lower edge of each of the transverse partitions will be parallel to the bottom of the carton and this design will give a greater amount of protection between articles in adjacent compartments of the same row. However, if desired, the upper edge of each of said secondary panel portions 22 may be at an oblique angle to the primary panel portion as is shown in FIGURE 1.

The handle portion of the interior assembly of the carton shown in FIGURE 19 will function in exactly the same manner as that described above in connection with FIGURES 1 to 14, via the interaction of the ancillary panel portions 11 and 12.

If desired, and during the folding of the one-piece blank shown in FIGURE 15, an occlusion panel such as is shown in FIGURE 2 may be incorporated in the interior assembly.

A further embodiment of the invention is illustrated in FIGURE 20 which shows a one-piece blank wherein the secondary panel portions 22, end tabs 23 and panels 23' of each primary panel 1, 2 are omitted, and the depth of the end tabs 16 and 54 increased. Moreover, as will be seen from FIGURE 20, the tertiary panel 50 has a constant width throughout its depth as does the corresponding strip 43 of adhesive on end wall panel 33.

Figure 21:
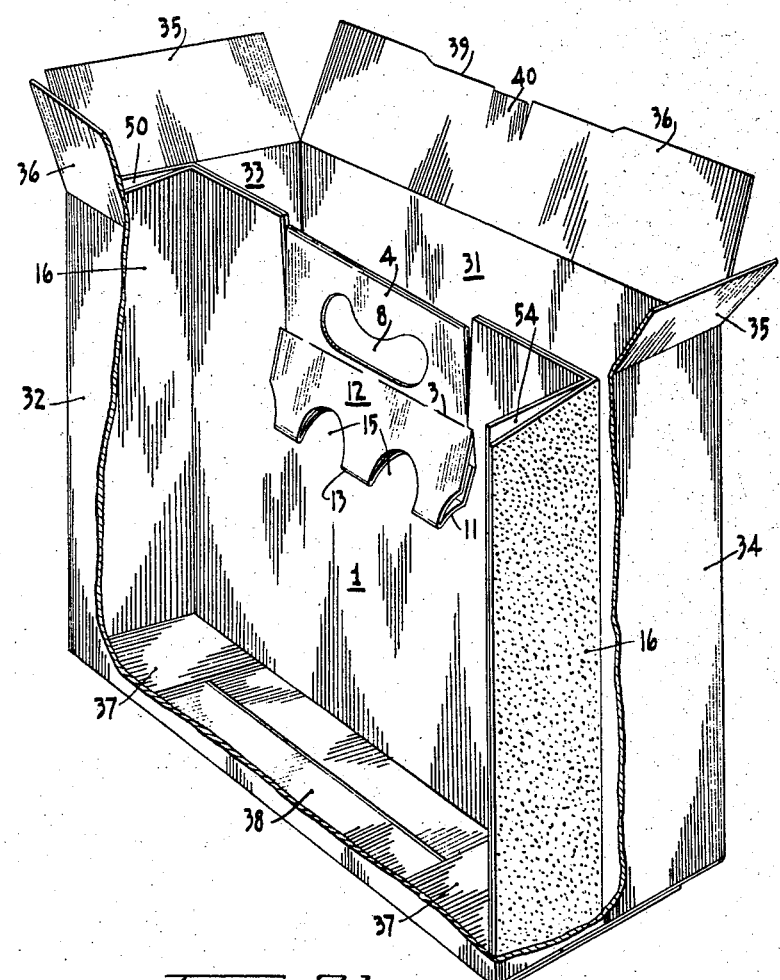
FIGURE 21 is a part-sectional perspective view of an erected carton, formed by the one-piece blank of FIGURE 20, showing the handle member in its lowermost position.

As the one-piece blank shown in FIGURE 20 subsequently forms a type of carton only possessing a central longitudinal partition having a handle portion, and as is shown in FIGURE 21, the side wall panels 31, 32 of the wall structure 30 are not provided with adhesive strips.

The one-piece blank shown in FIGURE 20 is folded in a generally similar manner to that described above in connection with FIGURES 16–18 thereof. A knock-down carton will thus be formed.

It will be noted, in connection with the one-piece blanks shown in FIGURES 15 and 20 that the tertiary panel 50 is integrally connected to the side wall panel 32. However, and if desired, it is within the scope of the present invention integrally to connect the tertiary panel 50 to an end wall panel, such as is shown in FIGURE 22, where said tertiary panel is connected to end wall panel 33.

All types of one-piece blank shown in FIGURES 15 to 22 of the accompanying drawings may, if desired, omit the top closure flaps, so as to provide open-topped cartons, without departing from the spirit of the invention.

I claim:

1. A carton having a wall structure comprising side and end walls and a bottom, and interior assembly fixed to said wall structure defining adjacent longitudinal rows of article receiving compartments, said interior assembly being constituted by a primary panel portion extending along the entire longitudinal axis of the carton to form a longitudinal partition; said primary panel portion including an extensible carrying handle integral therewith capable of movement from a retracted position to an extended position and vice versa; said carrying handle including two pairs of complementary mutually opposed ancillary panel portions and two complementary opposed auxiliary panels joined face to face and connected along a common score line, the ancillary panel portions of each pair being connected together along a common score line and located between said primary panel portion and said auxiliary panels, one ancillary panel of each pair being a continuation of the associated auxiliary panel uninterrupted by cutting or scoring and exceeding in depth the other ancillary panel of the pair; said pair of selected ancillary panel portions normally opposing movement of said handle between either of said positions and being deformable directly and solely to assist movement of the handle to either of said positions after a predetermined amount of movement of said handle has taken place and, thereafter, maintaining said handle in either of its said positions.

2. A carton as defined in claim 1, including a plurality of cut-outs in said ancillary panels extending across the common score lines thereof.

3. A one-piece blank adapted to form a unitary member constituting an interior assembly defining adjacent longitudinal rows of article receiving compartments within a carton having a wall structure comprising side and end walls and a bottom; said blank being cut and scored to provide a pair of complementary primary panels and a pair of complementary auxiliary panels integral with said primary panels and joined together along a common score line; said primary panels being adapted, on folding of said auxiliary panels along said common score line, to be secured to one another at specified areas thereof, as well as to said wall structure to form a longitudinal partition; said auxilary panels being adapted, on folding along said common score line and attachment to one another, to form an extensible carton carrying handle capable of movement from a retracted position to an extended position and vice versa; said blank being further cut and scored to provide complementary pairs of ancillary panels integral with and located between each said primary panel and each said auxiliary panel, the ancillary panels of each pair being connected together along a common score line; one ancillary panel of each pair being a continuation of the associated auxiliary panel uninterrupted by cutting or scoring and exceeding in depth the other ancillary panel of the pair; said pairs of ancillary panels, on attachment of said unitary member to said wall structure, normally being adapted to oppose movement of said handle portion between either of said positions and being deformable so as directly and solely to assist movement of the handle portion to either of said positions after a predetermined amount of movement of said handle portion has occurred and, thereafter, to maintain said handle in either of its said positions.

4. A one-piece blank as defined in claim 3, including a plurality of cut-outs in said ancillary panels extending across the common score lines thereof.

5. A one-piece blank adapted to form a carton having a wall structure including a pair of mutually opposed side walls, a pair of mutually opposed end walls, and a bottom, and an interior assembly defining adjacent longitudinal rows of article receiving compartments within the carton, said assembly including a handle member; said blank being cut and scored to provide (a) a plurality of main panels integrally and hingedly connected together and adapted, on folding of the blank and erection of the carton, to form said wall structure;

(b) a pair of complementary primary panels;

(c) at least one tertiary panel integrally and hingedly connected, at one end thereof and by means of a first geminal score line, to one end of a selected one of said primary panels and, at the other end thereof and by means of an auxiliary common score line, to a selected one of said main panels, said tertiary panel, on folding thereof along said auxiliary common score line, being secured to a main panel ultimately forming one end wall of the said mutually opposed pair thereof;

(d) at least one end tab integrally and hingedly connected, by means of a common score line, to the end, remote from said tertiary panel, of a selected one of said primary panels and adapted, on folding along said common score line, to be secured to the main panel ultimately forming the remaining end wall of the said mutually opposed pair thereof;

(e) a pair of complementary auxiliary panels integral with said primary panels and joined together along a first common score line; said primary panels being adapted, on folding of said auxiliary panels along said first common score line, to be secured to one another at specified areas thereof and, on erection of the carton and hinging about said first geminal score line and said common score line associated with said end tab to extend at right angles to said tertiary panel and said end tab and to form a longitudinal partition extending between said pair of mutually opposed end walls and along the central longitudinal axis of the carton; said auxiliary panels being adapted, on folding along said common score line and attachment to one another, to form an extensible carton carrying handle capable of movement from a retracted position to an extended position and vice versa;

(f) complementary pairs of ancillary panels integral with and located between each said primary panel and each said auxiliary panel, the ancillary panels of each pair being connected together along a common score line; one ancillary panel of each pair being a continuation of the associated auxiliary panel uninterrupted by cutting or scoring and exceeding in depth the other ancillary panel of the pair; said pairs of ancillary panels, on folding of said blank and erection of said carton, normally being adapted to oppose movement of said handle portion between either of said positions and being deformable so as directly and solely to assist movement of the handle portion to either of said positions after a predetermined amount of movement of said handle portion has occurred and, thereafter, to maintain said handle in either of its said positions.

6. A one-piece blank as defined in claim 5 including a plurality of cut-outs in said ancillary panels extending across the common score lines thereof.

References Cited in the file of this patent
UNITED STATES PATENTS

| | | |
|---|---|---|
| 2,354,528 | Lowey | July 25, 1944 |
| 2,373,851 | Potter | Apr. 17, 1945 |
| 2,700,486 | Arneson | Jan. 25, 1955 |
| 2,850,206 | Pasjack | Sept. 2, 1958 |
| 2,900,106 | Vesak | Aug. 18, 1959 |
| 2,943,762 | Richardson | July 5, 1960 |